Figure 1:
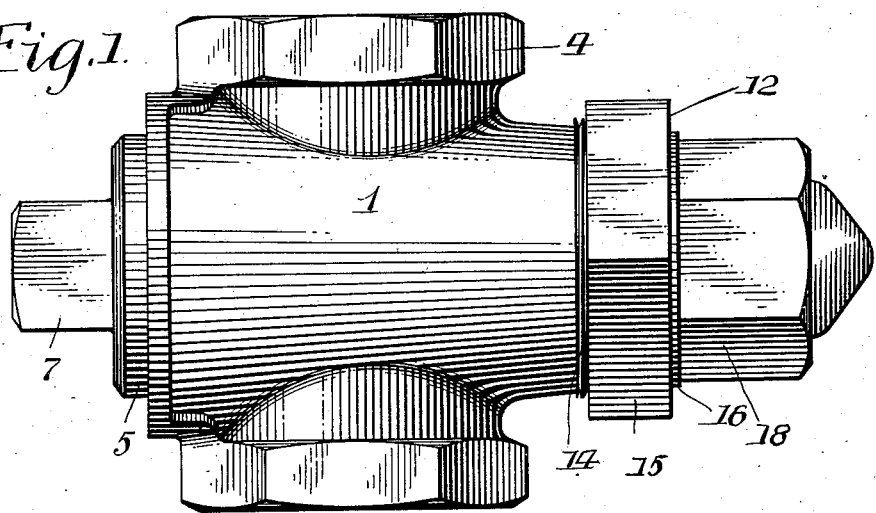

J. C. KAHLE.
VALVE.
APPLICATION FILED APR. 20, 1911.

1,010,149.

Patented Nov. 28, 1911.

WITNESSES:
Samuel Payne
K. H. Butler

INVENTOR.
James C. Kahle.
BY
ATTORNEYS.

UNITED STATES PATENT OFFICE.

JAMES C. KAHLE, OF OIL CITY, PENNSYLVANIA.

VALVE.

1,010,149.    Specification of Letters Patent.    Patented Nov. 28, 1911.

Application filed April 20, 1911. Serial No. 622,220.

*To all whom it may concern:*

Be it known that I, JAMES C. KAHLE, a citizen of the United States of America, residing at Oil City, in the county of Venango and State of Pennsylvania, have invented certain new and useful Improvements in Valves, of which the following is a specification, reference being had therein to the accompanying drawing.

This invention relates to valves, and more particularly to that type having a rotary plug or stem.

The object of the invention is to furnish a valve body with simple and effective means for shifting, unseating or locking the plug or stem of the valve.

My invention aims to provide a simple, durable and inexpensive device that can be easily adjusted to unseat a valve plug or stem should the same become wedged or fixed in the valve body, due to a long period of idleness, the formation of incrustations or other causes especially encountered in the oil well fields. The same device can be used for locking the valve plug or stem in an adjusted position, and with slight changes in the present type of valve body, the device can be applied to said valve body.

The invention will be hereinafter specifically described and then claimed, and reference will now be had to the drawing, wherein:—

Figure 2:
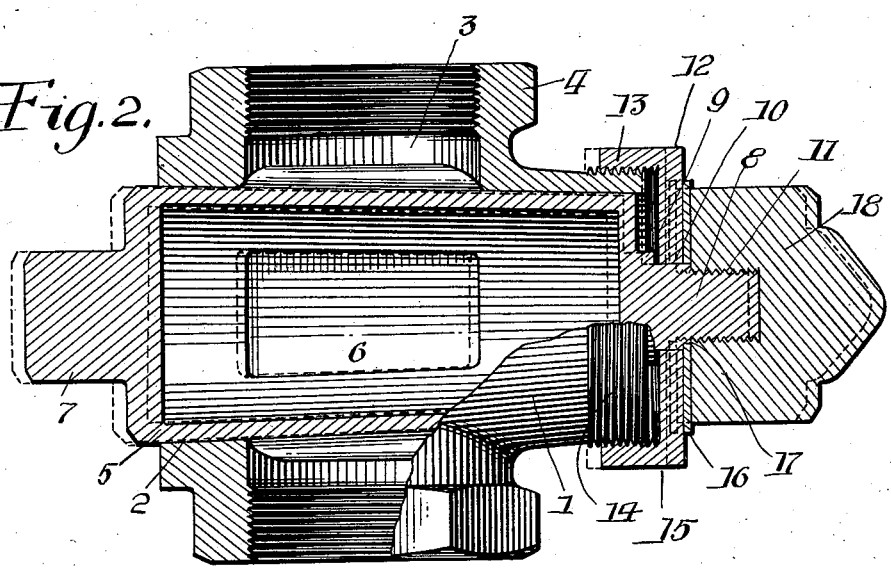

Figure 1 is a side elevation of a valve in accordance with this invention, and Fig. 2 is a longitudinal sectional view of the same.

A valve in accordance with this invention comprises a body 1 having a longitudinal tapering bore 2 formed therein and in communication with said bore are longitudinally alining inlet and outlet openings 3 formed in nipples 4, carried by the body 1. Seated in the bore 2 is a tapering hollow plug 5 having the walls thereof provided with diametrically opposed openings 6 adapted to register with the openings 3 when the valve is open and to be closed by the walls of the body 1, when the valve is closed. The upper end of the valve plug 5 is provided with a nut 7 whereby said plug can be rotated by a wrench or other instrument (not shown). The lower end of the valve plug 5 is provided with a stem 8 having a collar 9 adjacent to the lower end of the plug 5, an annular shoulder 10 and screw threads 11. Rotatably mounted upon the annular shoulder 10 is a cap 12 having an annular flange 13 with the interior walls thereof screw threaded to screw upon the threads 14 carried by the lower end of the valve body 1. The outer side of the cap 12 is provided with facets 15 whereby it can be easily rotated. Mounted upon the shoulder 10 is a disk 16, said shoulder having a flat face 17 to prevent the disk 16 from rotating. The disk 16 is retained in engagement with the cap 12 by a nut 18 screwed upon the threaded stem 8. It is preferable to make the screw threads 14 left hand and the screw threads 11 right hand, and when it is desired to lock the plug 5 within the bore 2, the cap 12 is unscrewed and bears against the disk 16 and said disk against the nut 18, thereby pulling downwardly upon the plug 5 and firmly locking the same in the bore 2. To unseat the valve plug 5, the cap 12 is screwed upon the body and as said cap engages the collar 9, the plug 5 will be forced upwardly, as shown by dotted lines in Fig. 2. The unseating movement of the plug 5 is limited by the cap 12 engaging the end of the body 1, it being essential for a successful operation of the device that the plug be made of a sufficient length to allow the collar 9 to protrude a slight distance below the lower end of the valve body.

It is though that the operation and utility of the device will be apparent without further description, and while in the drawing there is illustrated a preferred embodiment of the invention, it is to be understood that the structural elements thereof are susceptible to such changes as fall within the scope of the appended claims.

What I claim is:—

1. In a valve, a valve body having the lower end thereof screw threaded, a valve plug rotatably mounted in said body, a threaded stem carried by the lower end of said plug, a collar carried by said stem at the bottom of said plug, a cap rotatably mounted upon said stem and adapted to screw upon the lower end of said body and engage said collar to unseat said plug, a disk mounted upon said stem against said cap, and a nut screwed upon said stem and adapted to retain said disk in engagement with said cap.

2. In a valve, a valve body having a bore formed therein, a plug adapted to seat in said bore, a stem carried by the lower end of said plug, a cap adjustably mounted upon the lower end of said body and adapted to shift said plug in said bore, a disk mounted upon said stem, and a nut mounted upon said stem and adapted to retain said disk thereon.

In testimony whereof I affix my signature in the presence of two witnesses.

JAMES C. KAHLE.

Witnesses:
DORSEY P. KAHLE,
LEE A. McCRACKEN.

Copies of this patent may be obtained for five cents each, by addressing the "Commissioner of Patents, Washington, D. C."